C. C. FARMER.
CONDUCTOR'S VALVE FOR FLUID PRESSURE BRAKES AND SIGNALS.
APPLICATION FILED MAR. 6, 1907.

979,837.

Patented Dec. 27, 1910.

WITNESSES
J S Custer
J B MacDonald

INVENTOR
Clyde C. Farmer
by E. W. Wright Att'y.

UNITED STATES PATENT OFFICE.

CLYDE C. FARMER, OF CHICAGO, ILLINOIS, ASSIGNOR TO THE WESTINGHOUSE AIR BRAKE COMPANY, OF PITTSBURG, PENNSYLVANIA, A CORPORATION OF PENNSYLVANIA.

CONDUCTOR'S VALVE FOR FLUID-PRESSURE BRAKES AND SIGNALS.

979,837. Specification of Letters Patent. Patented Dec. 27, 1910.

Application filed March 6, 1907. Serial No. 360,909.

*To all whom it may concern:*

Be it known that I, CLYDE C. FARMER, a citizen of the United States, residing at Chicago, in the county of Cook and State of Illinois, have invented certain new and useful Improvements in Conductors' Valves for Fluid-Pressure Brakes and Signals, of which the following is a specification.

My invention relates to that type of valve known as a conductor's valve, used in connection with a fluid pressure brake or signaling system, whereby the flow of fluid through the system may be controlled from any part of a car or train of cars, to which such system may be applied, in a manner to operate the brakes or a signal, and its objects are: to provide a conductor's valve of the class described which may be operated from a near or distant point with more facility and certainty than prior devices; to provide a valve which may be more readily opened against the pressure in the brake or signal system; to provide operating means for such valve which will exert greater power to open the valve at the beginning of its movement than immediately thereafter and a more rapid motion of the valve just after opening to procure prompt brake application; to provide a valve which in closing automatically, when released, will act more positively and freely; to provide means for holding the valve in its open position, and to generally improve upon the present form of valve and provide a more efficient and reliable construction of apparatus. These objects and other advantages which will hereinafter appear, I attain by means of the construction illustrated in preferred form in the accompanying drawings, wherein:—

Figure 1:
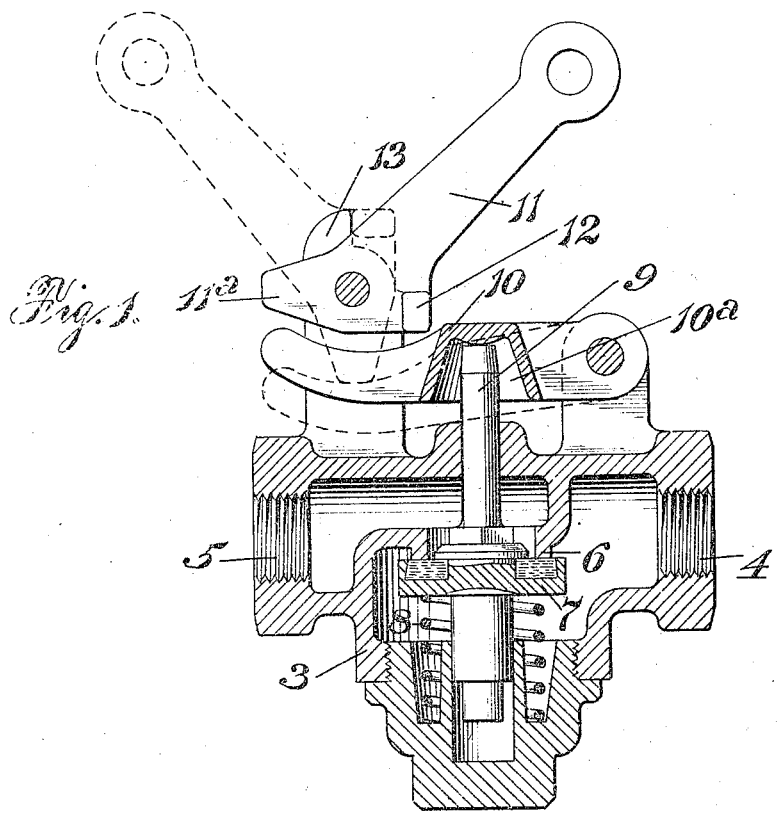
Figure 2:
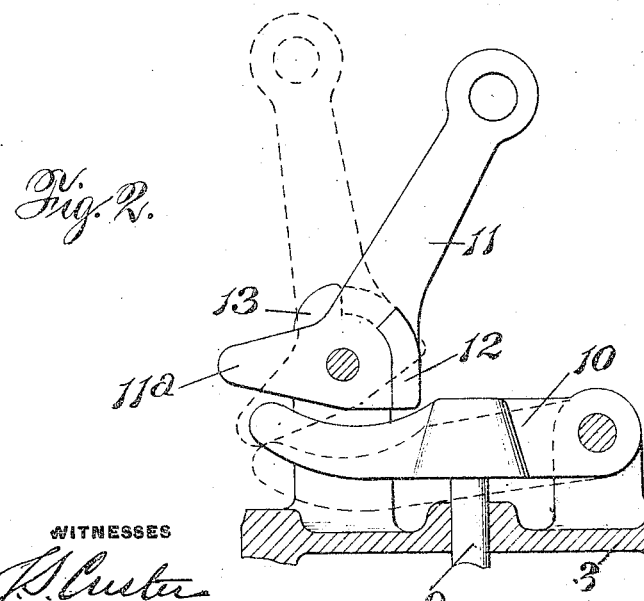

Figure 1 is a longitudinal vertical section through a conductor's valve, embodying my improvements, the construction of the operating levers being such that the valve will be locked in its open position, and Fig. 2 is a similar view of a slightly modified form of the operating levers, which will permit the valve to automatically close when released.

In some forms of brake and signal systems it is desirable to have a conductor's valve, which when once thrown to the open or operative position will remain so until it is desired to close the same, while in others a valve which will automatically close is to be preferred, it is also to be desired that such valve should open easily against the pressure in the system, and by reference to the accompanying drawings it will be seen that I have designed a form of apparatus, which when slightly modified will work equally well under either of the above conditions.

My device consists primarily of a valve, casing 3, provided with inlet and outlet openings 4 and 5 respectively, and a valve seat 6 which may be of any preferred construction, such for instance, as that illustrated in Fig. 1, wherein the seat 6 is upon the inlet side, and has a valve 7, normally held in position thereon by means of a spring 8. The valve 7 is provided with a stem 9, projecting through the casing 3, and into engagement with an intermediate lever 10, pivoted at one end to the outside of the casing and having its other end in position to be engaged by the short arm of an operating lever 11, also pivoted to the outside of the casing 3, but adapted to work at an approximately right angle to the lever 10.

In order to insure a continuous contact between the valve stem 9 and the lever 10, the former projects up into an opening 10$^a$ in the latter and bears against the convex bottom of said opening, such construction being adapted to cause the lever 10 to bear directly down upon the valve 9 during the entire course of its movement. The outer end of the lever 10, which is acted upon by the lever 11, is preferably curved to facilitate the operation of the parts as well as to permit of a more compact construction, although said lever may if desired be made straight without departing from the nature of my invention.

The movement of the lever 11 is regulated by means of a stop 12, with which it is provided and which abuts against the lugs 13, in which said lever is pivoted, when the lever is in its upright or operative position and the valve is open. The outer or long end of the lever 11 is adapted to be connected to a cord or other suitable mechanism by which it may be operated from a distant point in the usual manner.

When it is desired to use a construction of valve which will remain in the open position, the cam portion 11$^a$ of the lever 11, is flattened where it engages the lever 10, and when brought to the position indicated by dotted lines in Fig. 1 it will remain so, and the valve will be open until it is returned to its original position by hand. If it is desirable to have the valve close as soon as the tension on the handle is released, the cam portion 11ª of the lever 11 is extended as shown in Fig. 2, which prevents the lever 11 taking such locking position as shown in Fig. 1, and will permit the spring 8 to close the valve and return the levers to their original position as soon as the lever 11 is released.

Other advantages of the device will readily occur to those familiar with the art.

Having thus described my invention and illustrated its use, what I claim as new and desire to secure by Letters Patent, is the following:

1. A conductor's valve comprising a casing, a valve therein, an operating mechanism for said valve adapted to be operated from a distant point and adapted to exert its maximum power upon initial movement to open said valve.

2. A conductor's valve comprising a casing, a valve therein, an operating mechanism for said valve adapted to be operated from a distant point and having means for exerting its maximum force upon initial movement to open said valve and a positive stop device for limiting the movement of said operating mechanism.

3. A conductor's valve comprising a casing, a valve therein, an operating mechanism adapted to be operated from a distant point and comprising a camming means adapted to exert greatest power at the beginning of its movement to open the valve and an intermediate lever interposed between said camming means and the stem of the valve.

4. A conductor's valve comprising a casing, a valve therein, an operating mechanism adapted to be operated from a distant point and comprising an intermediate lever pivoted at one end and having its free end curved for engaging the stem of the valve, and an operating lever adapted to bear upon said curved portion and having a portion of its bearing surface flattened to lock the valve in its open position.

In testimony whereof I have hereunto signed my name in the presence of the two subscribed witnesses.

CLYDE C. FARMER.

Witnesses:
C. J. OLMSTEAD,
S. G. DOWN.